United States Patent
Uemori et al.

(10) Patent No.: US 8,038,888 B2
(45) Date of Patent: Oct. 18, 2011

(54) FLUID TREATMENT DEVICE FOR FLUID ACTIVATION

(75) Inventors: Saburo Uemori, Kobe (JP); Eisuke Yoshioka, Kobe (JP); Kazuo Shimada, Ashiya (JP)

(73) Assignees: Saburo Uemori, Hyogo (JP); Eisuke Yoshioka, Hyogo (JP); Kazuo Shimada, Hyogo (JP)

( * ) Notice: Subject to any disclaimer, the term of this patent is extended or adjusted under 35 U.S.C. 154(b) by 324 days.

(21) Appl. No.: 12/311,163

(22) PCT Filed: Sep. 13, 2007

(86) PCT No.: PCT/JP2007/067842
§ 371 (c)(1),
(2), (4) Date: Mar. 20, 2009

(87) PCT Pub. No.: WO2008/035615
PCT Pub. Date: Mar. 27, 2008

(65) Prior Publication Data
US 2010/0084274 A1 Apr. 8, 2010

(30) Foreign Application Priority Data
Sep. 22, 2006 (JP) .................................. 2006-257122

(51) Int. Cl.
*C02F 1/48* (2006.01)
(52) U.S. Cl. ........................................ 210/695; 210/222
(58) Field of Classification Search .................. 210/695, 210/222
See application file for complete search history.

(56) References Cited

U.S. PATENT DOCUMENTS
7,090,776 B2 * 8/2006 Mochizai ...................... 210/695

FOREIGN PATENT DOCUMENTS
| JP | 2002-45864 | 2/2002 |
| JP | 2004-130251 | 4/2004 |
| JP | 2004-144059 | 5/2004 |
| JP | 2004-255303 | 9/2004 |
| JP | 3106416 | 10/2004 |
| JP | 2006-75767 | 3/2006 |

OTHER PUBLICATIONS
Translation of the Written Opinion for PCT/JP2007/067842, Mar. 20, 2009.*

* cited by examiner

*Primary Examiner* — David A Reifsnyder
(74) *Attorney, Agent, or Firm* — Clark & Brody

(57) ABSTRACT

A periphery of a fluid passage (1) extended through a casing (10) is enclosed by a conductive metal layer (5) formed from a non-magnetic material. Four permanent magnets (M1 to M4) are arranged along an outside surface of the inside conductive metal layer (5). The individual permanent magnets (M1 to M4) are closely spaced from each other as defining gaps (G) therebetween. The north poles and the south poles of the magnets are closely spaced from each other at a gap (G) between a first permanent magnet (M1) and a second permanent magnet (M2), and a gap (G) between a third permanent magnet (M3) and a fourth permanent magnet (M4). The permanent magnets (M1 to M4) are totally and solidly enclosed by a magnetic material layer (7).

9 Claims, 9 Drawing Sheets

US 8,038,888 B2

FLUID TREATMENT DEVICE FOR FLUID ACTIVATION

TECHNICAL FIELD

The present invention relates to a fluid treatment device for magnetically activating fluid such as water.

BACKGROUND ART

Recently, water treatment devices for activating water by means of magnetic force and electrons have been proposed. The fluid treatment device for fluid activation operates as follows. When the magnetic force and electrons are applied to water, clusters of water molecules are reduced in size and negatively charged to be rendered faintly alkaline, whereby water is activated.

As shown in FIG. 9, a conventional water treatment device 100 for activation, for example, includes a first permanent magnet 102 and a second permanent magnet 103 facing each other across a water conduit 101, and a pair of U-shaped yokes 104, 105 formed from a magnetic metal and encompassing these water conduit 101, first permanent magnet 102 and second permanent magnet 103. The paired yokes are accommodated in a casing not shown (see, for example Japanese Unexamined Patent Publication No. 2004-130251).

The paired yokes 104, 105 face each other on recessed sides thereof. Between the opposite ends of the first yoke 104 and the opposite ends of the second yoke 105, there is a predetermined gap X.

The first permanent magnet 102 has its south pole side bonded to an inside bottom of the first U-shaped yoke 104, while the second permanent magnet 103 has its north pole side bonded to an inside bottom of the second U-shaped yoke 105. Accordingly, the north pole of the first permanent magnet 102 and the south pole of the second permanent magnet 103 face each other across the water conduit 101. In addition, the south pole of the first permanent magnet 102 is transferred to the opposite ends 104a of the first U-shaped yoke 104 while the north pole of the second permanent magnet 103 is transferred to the opposite ends 105a of the second U-shaped yoke 105. The south poles and north poles thus transferred magnetically attract each other thereby forming a magnetic circuit for preventing magnetic flux lines 107 across the water conduit 101 from leaking out of the U-shaped yokes 104, 105.

A conductive metal layer 110 formed from a non-magnetic material such as copper extends along inside surfaces of the pair of U-shaped yokes 104, 105 as closing the aforementioned gaps X. The non-magnetic material has a higher potential than that of the magnetic metal forming the U-shaped yokes 104, 105.

According to the water treatment/activation device of the above constitution, water flowing through the water conduit 101 in a direction of an arrow 108 intersects with the magnetic flux lines 107 so as to be activated magnetically. In addition, the water intersecting with the magnetic flux lines 107 generates electromotive current in a direction perpendicular to the flowing direction of the water (direction of an arrow 109, for example) so that electrons are released in the water. Hence, the water can be electrochemically activated by the electrons thus released.

Particularly, the magnetic force released from the first permanent magnet 102 and the second permanent magnet 103 is biased toward the water conduit 101 by the conductive metal layer 110 so that the magnetic fluxes in the water conduit 101 is increased in density to promote the generation of the electromotive current. In addition, the conductive metal layer 110 has a higher potential than the magnetic metal forming the U-shaped yokes 104, 105. Hence, the potential of the conductive metal layer 110 is further increased by bimetallic cell action so that the electrons are released into the water more efficiently. Thus, the water treatment/activation device 100 is capable of activating water effectively.

DISCLOSURE OF THE INVENTION

For achieving a more effective activation of water, however, the above water treatment/activation device must employ such permanent magnets 102, 103 as are capable of generating an even greater magnetic force. Therefore, the permanent magnets 102, 103 are increased not only in cost but also in size. Accordingly, the water treatment/activation device 100 is also increased in size. In addition, the gaps X need to be provided between the opposite ends 104a, 105a of the paired U-shaped yokes 104, 105. This makes it impossible to effectively prevent the magnetic force released from the first permanent magnet 102 and the second permanent magnet 103 from partially leaking through the gaps X to the outside of the U-shaped yokes 104, 105. The device is accordingly reduced in the effect to apply the magnetic force to the water flowing through the water conduit 101.

In view of the foregoing problems, the invention seeks to provide a fluid treatment device for fluid activation which is capable of more effectively applying the magnetic force to the fluid without relying on a source of powerful magnetic force, thereby activating the fluid even more effectively.

According to the invention for achieving the above object, a fluid treatment device for fluid activation including at least a pair of permanent magnets arranged around a fluid passage extended through a casing and using a magnetic force of the permanent magnets for activating fluid flowing through the fluid passage, the treatment device comprises: a conductive metal layer interposed between the fluid passage and the permanent magnets and formed from a non-magnetic material enclosing the fluid passage; and a tubular magnetic material layer totally and solidly enclosing the permanent magnets thereby preventing the magnetic force of the permanent magnets from leaking out of the casing, and is characterized in that the paired permanent magnets are closely spaced from each other in a predetermined angular relation and define a gap therebetween and that one of the permanent magnets presents its north pole to the fluid passage while the other permanent magnet presents its south pole to the fluid passage.

According to the fluid treatment device for fluid activation, the paired permanent magnets are allowed to generate magnetic flux lines therebetween so as to apply the magnetic force thereof to the conductive metal layer enclosing the fluid passage and to the fluid flowing through the fluid passage. Particularly, the device is adapted to generate extremely dense magnetic flux lines in the vicinity of the gap where the south and north poles are closest to each other, so that a more intensive magnetic force can be applied to the fluid flowing through the fluid passage. Furthermore, the permanent magnets are totally and solidly enclosed by the tubular magnetic material layer, which can effectively prevent the magnetic force of the permanent magnets from leaking out of the casing. What is more, the conductive metal layer is interposed between the permanent magnets and the fluid passage. Namely, the conductive metal layer is located at a place closer to the fluid passage so as to be able to bias the magnetic flux lines toward the center of the fluid passage more effectively. Thus, the fluid passage is further increased in the magnetic flux density for effectively generating electromotive force, whereby electron release is further increased while the leakage of electrons is minimized.

It is preferred in the above fluid treatment device for fluid activation that the permanent magnets are provided in two pairs and are arranged in closely spaced relation to define a quadrangular space as defining gaps therebetween.

In this case, the device is adapted to increase the magnetic flux density at least at two areas near the gap between one pair of permanent magnets and near the gap between another pair of permanent magnets. Hence, the device is capable of more effectively applying the magnetic force to the fluid flowing through the fluid passage.

It is preferred that the fluid passage has a quadrangular cross section conforming to the quadrangular space. This permits the fluid to flow closer to the above areas having the high magnetic flux density so that the magnetic force may be even more effectively applied to the fluid.

The magnetic material layer may also comprise a part of the casing. In this case, the device may be simplified in construction because the device does not require a tubular component to constitute the magnetic material layer.

In the above fluid treatment device for fluid activation, the conductive metal layer, the permanent magnets and the magnetic material layer may be integrated into a single unit. In this case, a fluid treatment/activation device capable of treating a large volume of fluid can be fabricated easily by two-dimensionally or three-dimensionally combining together the above units and accommodating the combined units in the casing.

The conductive metal layer may also be formed on a surface of the permanent magnet. This provides for an easy fabrication of the device because the conductive metal layer can be formed by merely arranging the permanent magnets.

According to another aspect of the invention, a fluid treatment device for fluid activation which includes at least a pair of permanent magnets having the north pole and the south pole thereof opposed to each other across a fluid passage extended through a casing and which uses a magnetic force of the permanent magnets for activating fluid flowing through the fluid passage, the treatment device comprises: a conductive metal layer interposed between the fluid passage and the permanent magnets and formed from a non-magnetic material enclosing the fluid passage; a tubular magnetic material layer totally and solidly enclosing the permanent magnets thereby preventing the magnetic force of the permanent magnets from leaking out of the casing; and at least a pair of yokes comprising magnetic bodies which discretely and magnetically make contact with one of the paired permanent magnets, which are arranged along an outside surface of the conductive metal layer as defining gaps therebetween and one of which has the north pole closely spaced from the south pole of the other magnetic body via the gap.

According to the fluid treatment device for fluid activation, the paired permanent magnets are allowed to generate the magnetic flux lines therebetween so as to apply the magnetic force thereof to the fluid flowing through the fluid passage. Particularly, the device is adapted to generate the extremely dense magnetic flux lines in the vicinity of the gap between the pair of yokes where the south and north poles are closest to each other, so that a more intensive magnetic force can be applied to the fluid flowing through the fluid passage. Further, the permanent magnets are totally and solidly enclosed by the tubular magnetic material layer so that the magnetic force of the permanent magnets is effectively prevented from leaking out of the casing. In addition, the conductive metal layer is interposed between the permanent magnets and the fluid passage. That is, the conductive metal layer is located at a place closer to the fluid passage so as to be able to bias the magnetic flux lines toward the center of the fluid passage more effectively. Thus, the fluid passage is further increased in the magnetic flux density for effectively generating the electromotive force, whereby the electron release is increased further and the electron leakage is minimized.

Each of the above fluid treatment devices for fluid activation may further comprise a conductive metal layer formed from a tubular non-magnetic material and extending along an inside surface of the magnetic material layer for totally and solidly enclosing the permanent magnets. In this case, the magnetic flux lines can be biased toward the center of the fluid passage by means of the conductive metal layer extended along the inside surface of the magnetic material layer. Hence, the fluid passage is further increased in the magnetic flux density at the central area thereof so as to be capable of effectively generating the electromotive force. Thus, the electron release is increased further.

The fluid treatment device for fluid activation according to the invention is adapted for effective application of the magnetic force and the electrons to the fluid. Therefore, the device can more effectively activate the fluid without using powerful magnets.

BEST MODES FOR CARRYING OUT THE INVENTION

The embodiments of the invention will hereinbelow be described with reference to the accompanying drawings.

Figure 1:
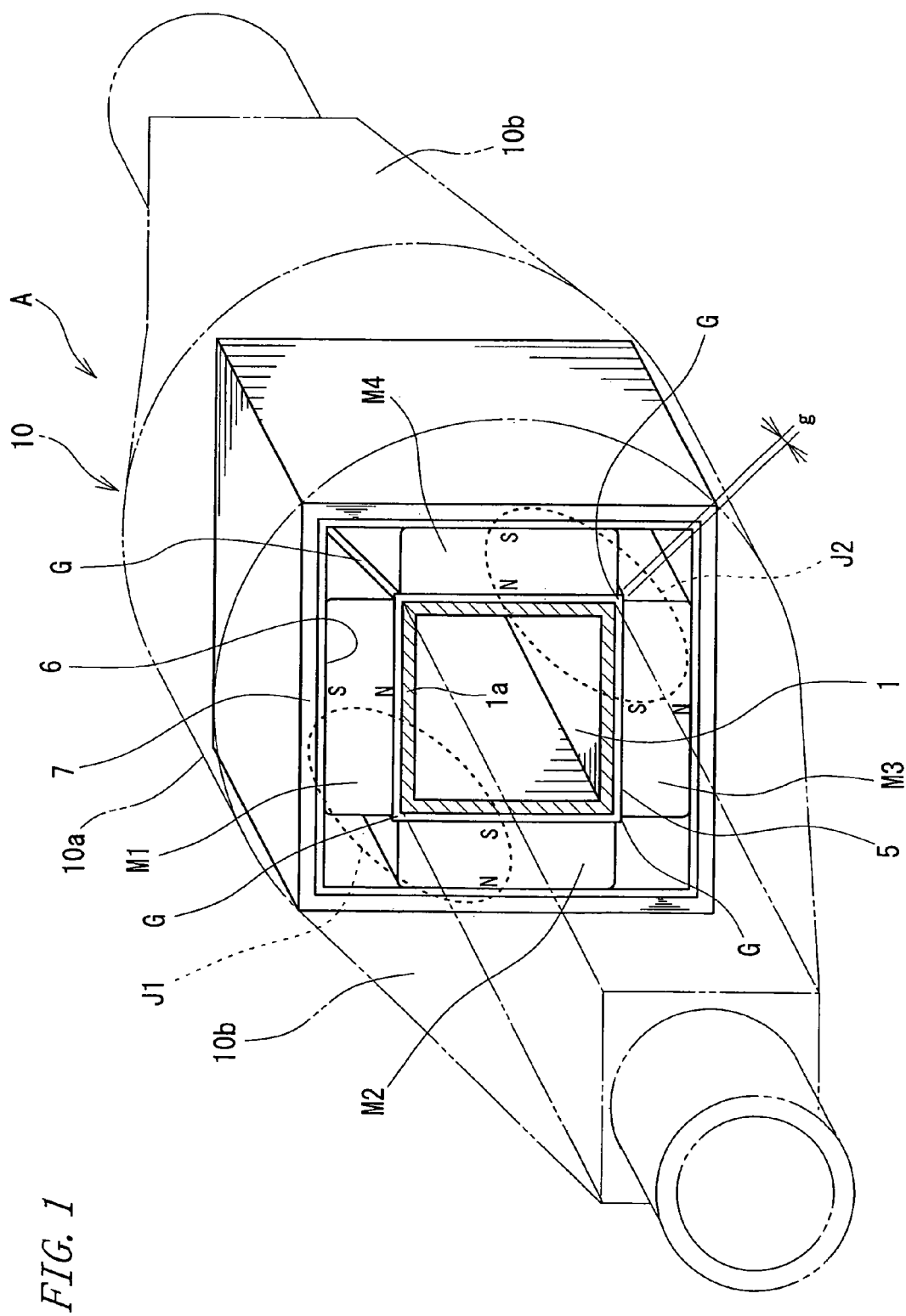
FIG. 1 is a perspective view showing one embodiment of the invention.
Figure 2:
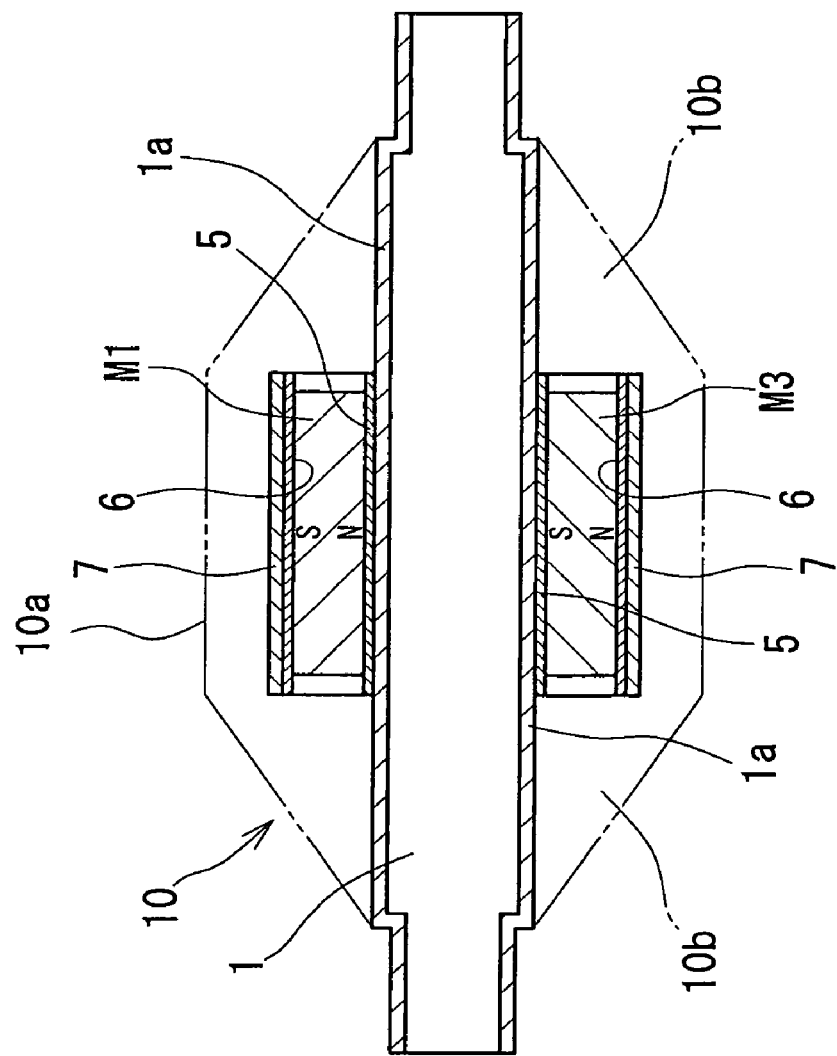
FIG. 2 is a sectional view of the above fluid treatment device for fluid activation.

FIG. 1 is a perspective view showing a fluid treatment device for fluid activation according to one embodiment of the invention. FIG. 2 is a sectional view of the device taken in the axial direction thereof. A fluid treatment device for fluid activation A shown in the figures includes in a casing 10: a fluid passage 1 allowing a fluid such as water to flow therethrough; an inside conductive metal layer 5 enclosing the fluid passage 1; a first permanent magnet M1, a second permanent magnet M2, a third permanent magnet M3 and a fourth permanent magnet M4 which are arranged along an outside surface of the inside conductive metal layer 5; an outside conductive metal layer 6 totally enclosing these permanent magnets M1 to M4; and a magnetic material layer 7 encompassing an outside surface of the outside conductive metal layer 6.

The whole body of the casing 10 is formed from white copper, stainless steel, a synthetic resin or the like. The casing includes: a peripheral wall portion 10a shaped like a short tube having a square or circular cross section; and tapered end wall portions 10b hermetically closing the opposite ends of the peripheral wall portion.

The fluid passage 1 is constituted by a pipe member 1a which is formed from a metal such as stainless steel or copper or a synthetic resin and which has a quadrangular (square) cross section. The fluid passage 1 is disposed in the center of the casing 10. The pipe member 1a has opposite ends projected from the end wall portions 10b of the casing 10 and connected with piping such as water pipe such that the fluid can flow through the fluid passage 1.

The inside conductive metal layer 5 is formed from a metal such as copper or silver which is a non-magnetic, electrically conductive metal. In the arrangement shown in the figure, the inside conductive metal layer 5 is constituted by a square pipe formed from the above metal and having the quadrangular (square) cross section. The inside conductive metal layer 5 solidly encloses the overall periphery of the pipe member 1a as making contact with the pipe member 1a constituting the fluid passage 1.

Of the permanent magnets M1 to M4, the first permanent magnet M1 is paired with the second permanent magnet M2, while the third permanent magnet M3 is paired with the fourth permanent magnet M4. These permanent magnets M1 to M4 are formed from neodymium, alnico, ferrite or the like and shaped like a flat plate. The magnets have a widthwise dimension (transverse dimension of the first permanent magnet M1) slightly shorter than each side of the inside conductive metal layer 5.

The first permanent magnet M1 and the second permanent magnet M2 are arranged in a manner to define a gap G therebetween as extending along outside surfaces of adjoining sides of the inside conductive metal layer 5 and to have inside corners at respective ends thereof closely spaced from each other. Further, the third permanent magnet M3 and the fourth permanent magnet M4 are arranged in a manner to define a gap G therebetween as extending along outside surfaces of adjoining sides of the inside conductive metal layer 5 and to have inside corners at respective ends thereof closely spaced from each other. Furthermore, gaps G are also defined between the first permanent magnet M1 and the fourth permanent magnet M4 adjoining thereto, and between the second permanent magnet M2 and the third permanent magnet M3. That is, the two pairs of permanent magnets M1 to M4 are arranged at right angles to each other so as to form a frame pattern defining a quadrangular space and are in a relation to define the gap G therebetween on their sides abutting on the inside conductive metal layer 5. The individual gaps G have a substantially equal dimension g which is designed to range from 0.2 to 2 mm, for example.

According to the embodiment, the first permanent magnet M1 and the second permanent magnet M2 present the north pole and the south pole to the fluid passage 1, respectively. The third permanent magnet M3 and the fourth permanent magnet M4 present the south pole and the north pole to the fluid passage 1, respectively. Therefore, the south pole and the north pole are opposed to each other as most closely spaced from each other at the respective gaps G between the first permanent magnet M1 and the second permanent magnet M2 and between the third permanent magnet M3 and the fourth permanent magnet M4.

The permanent magnets M1 to M4 arranged in this manner constitute a first magnetic circuit J1 wherein a magnetic force from the first permanent magnet M1 passes through the fluid passage 1 and returns to the first permanent magnet M1 via the second permanent magnet M2 and the magnetic material layer 7, and a second magnetic circuit J2 wherein a magnetic force from the fourth permanent magnet M4 passes through the fluid passage 1 and returns to the fourth permanent magnet M4 via the third permanent magnet M3 and the magnetic material layer 7.

Similarly to the inside conductive metal layer 5, the outside conductive metal layer 6 is formed from a metal such as copper or silver which is a non-magnetic, electrically conductive material. In the arrangement shown in the figure, the outside conductive metal layer 6 is constituted by a square pipe formed from the above metal and having the quadrangular (square) cross section. The outside conductive metal layer 6 totally and solidly encloses the permanent magnets M1 to M4. The outside conductive metal layer 6 is formed from the metal having a higher potential than the magnetic material layer 7. Hence, the outside conductive metal layer 6 can be further increased in internal potential due to the bimetallic cell action.

The magnetic material layer 7 is constituted by a tubular body formed from a magnetic material and having a quadrangular cross section. The magnetic material layer 7 totally and solidly encloses the permanent magnets M1 to M4 so as to prevent the magnetic force of the permanent magnets M1 to M4 from leaking out of the casing 10. A ferromagnetic material such as permalloy or soft iron may preferably be used as the magnetic material from the viewpoint of more effectively preventing the magnetic force from leaking out of the casing 10. The magnetic material layer 7 is in close contact with the outside surface of the outside conductive metal layer 6.

The inside conductive metal layer 5, the permanent magnets M1 to M4, the outside conductive metal layer 6 and the magnetic material layer 7 have an axial length substantially equal to an axial length of the peripheral wall portion 10a of the casing 10 (see FIG. 2).

In the fluid treatment device for fluid activation A of the above construction, the fluid flowing through the fluid passage 1 intersects with the two magnetic circuits J1, J2 (magnetic flux lines) so that the fluid can be activated by the magnetic force thereof. Further, the electromotive current is generated in a direction perpendicular to the flowing direction of the fluid, so that electrons are released in the fluid, thus electrochemically activating the fluid.

In this process, the magnetic flux density can be notably increased in the vicinity of the gap G between the pair of first permanent magnet M1 and second permanent magnet M2 and of the gap G between the other pair of third permanent magnet M3 and fourth permanent magnet M4 because the south poles and the north poles are closest to each other at these gaps G. Thus, the fluid flowing through the fluid passage 1 can be subjected to an intensive magnetic force. It is confirmed that the surface magnetic flux density in the vicinity of the gap G is about twice as high as the inherent surface magnetic flux density of the individual permanent magnets M1 to M4. Therefore, the fluid flowing through the fluid passage 1 can be more effectively activated. It is noted that the surface magnetic flux density is increased with the decrease of the gap G. It is also inferred that the inside conductive metal layer enclosing the fluid passage 1 is subjected to the magnetic force which magnetically and electrically induces changes in the inside conductive metal layer 5. This is also thought to contribute to the activation of the fluid flowing through the fluid passage 1.

Furthermore, the above-described embodiment has the following features for more effectively activating the fluid flowing through the fluid passage 1.

(1) The cylindrical magnetic material layer 7 totally and solidly encloses the permanent magnets M1 to M4 so that the magnetic force of the individual permanent magnets M1 to M4 may effectively be prevented from leaking out of the casing 10.

(2) The inside conductive metal layer 5 formed from the non-magnetic material is located at a place closer to the fluid passage 1, so that the magnetic flux lines may be more effectively biased toward the center of the fluid passage 1 by the conductive metal layer 5. Thus, the fluid passage 1 is increased in the magnetic flux density for effectively generating the electromotive force, such that the release of electrons is further promoted thereby permitting the fluid to include the electrons therein more effectively and minimizing the leakage of the electrons.

(3) Since the outside conductive metal layer 6 is also capable of biasing the magnetic flux lines toward the center of the fluid passage 1, the fluid passage 1 is further increased in the magnetic flux density for effectively generating the electromotive force. Hence, the release of electrons is further increased thereby permitting the fluid to include the electrons therein more effectively and minimizing the leakage of the electrons.

(4) Since the outside conductive metal layer 6 has the higher potential than the magnetic material layer 7, the outside conductive metal layer 6 is further increased in the internal potential due to the bimetallic cell action. Thus, the generated electrons can be more effectively released into the fluid flowing through the fluid passage 1.

(5) The fluid passage 1 has the quadrangular cross section conforming to the square frame-like space defined by the permanent magnets M1 to M4. Therefore, the fluid passage allows the fluid to flow closer to the gap G areas having the high surface magnetic flux density as compared with a fluid passage having a circular cross section. Thus, the fluid passage is capable of applying the magnetic force to the fluid even more effectively.

Figure 3:
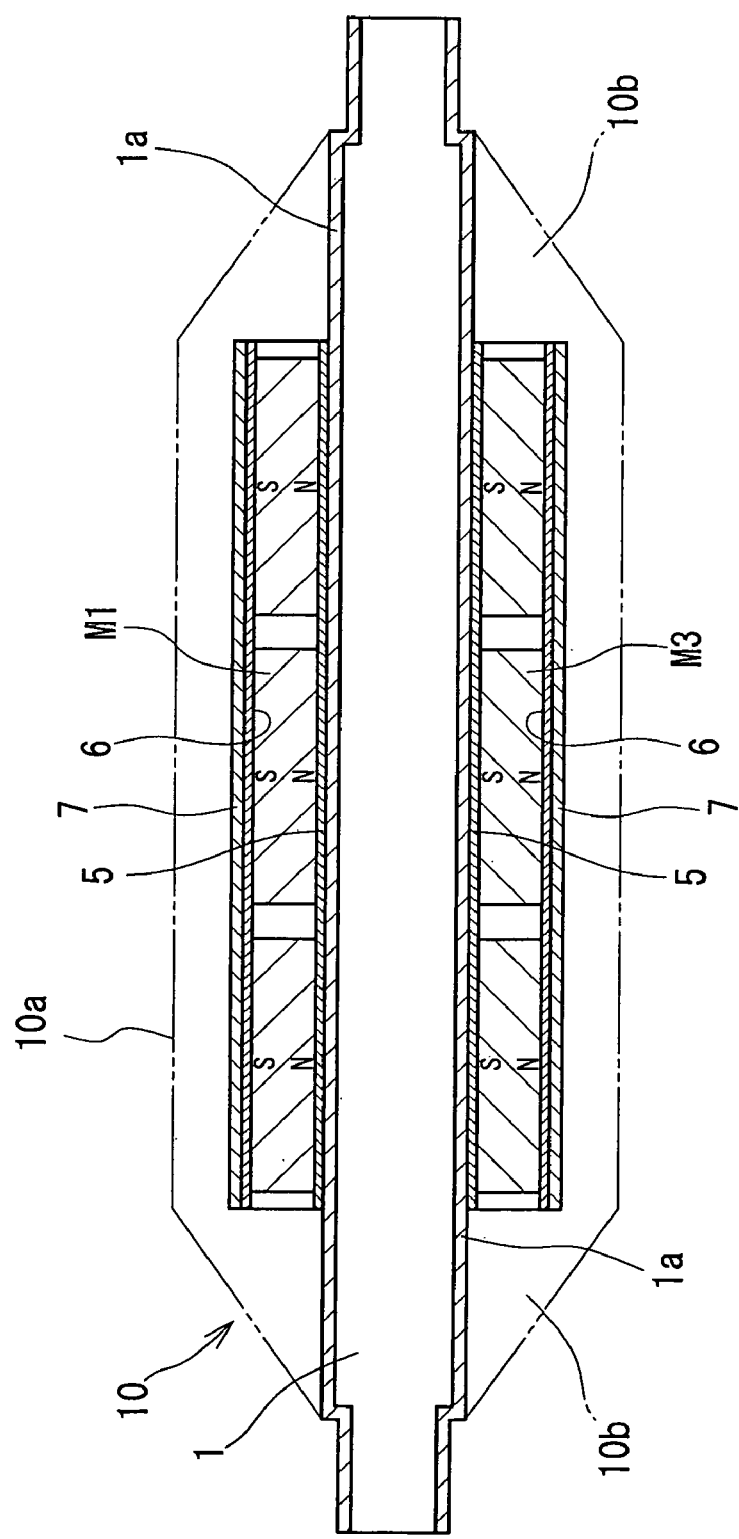
FIG. 3 is a sectional view showing another embodiment of the invention.

As shown in FIG. 3, the above fluid treatment/activation device A may also have an arrangement wherein the peripheral wall portion 10a of the casing 10, the pipe member 1a, the inside conductive metal layer 5 and the magnetic material layer 7 are individually increased in the axial lengths from those of the corresponding components of FIG. 1 and wherein plural sets of permanent magnets M1 to M4 are arranged in the axial direction of the fluid passage 1.

This embodiment is adapted to apply a sufficient magnetic force to the fluid even in a case where a large volume of fluid flows through the fluid passage 1 at a high fluid velocity (the throughput is great).

Figure 4:
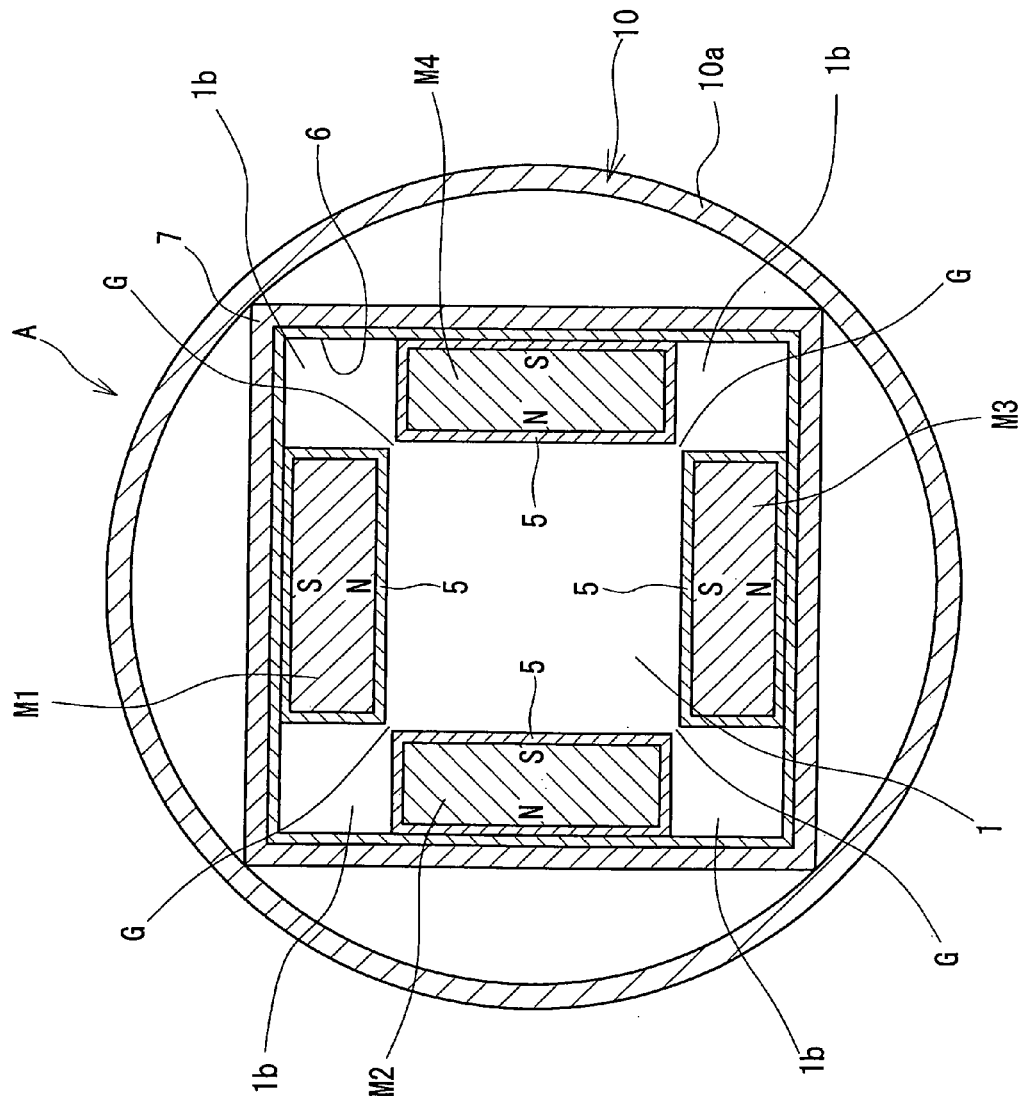
FIG. 4 is a sectional view showing still another embodiment of the invention.

FIG. 4 is a sectional view showing still another embodiment of the invention. This fluid treatment device for fluid activation is basically constructed the same way as the fluid treatment/activation device A shown in FIG. 1. The fluid treatment/activation device A shown in FIG. 4 differs from the device A shown in FIG. 1 in that the inside conductive metal layer 5 is formed on each of the permanent magnets M1 to M4 at least on its side facing the fluid passage 1 and that the fluid passage 1 is formed without using the pipe member 1a and is defined by the a space enclosed by the permanent magnets M1 to M4.

The outside conductive metal layer 6 is formed by covering each of the permanent magnets M1 to M4 with a metal sheet formed from a metal such as copper or silver which is a non-magnetic, electrically conductive material. The figure shows the permanent magnets M1 to M4 the overall surfaces of which are covered with the above metal sheet. The surface of the inside conductive metal layer 5 is further covered with a rust preventive layer of stainless steel, silicone resin or the like.

This fluid treatment/activation device A also permits the fluid to flow through rectangular spaces 1b defined between the four corners of the outside conductive metal layer 6 and the permanent magnets M1 to M4. Each of the gaps formed between the magnetic material layer 7 and the peripheral wall portion 10a of the casing 10 is provided with a seal as needed such as to block the passage of the fluid. In this embodiment, pipe lines for flowing the fluid through the fluid passage 1 are connected to openings at distal ends of the opposite end wall portions 10b of the casing 10.

The embodiment provides a notably simplified construction because the fluid passage 1 and the inside conductive metal layer 5 can be formed simply by mounting the permanent magnets M1 to M4 to places in the casing 10.

According to the embodiment, each adjoining pair of inside conductive metal layers 5 on the permanent magnets M1 to M4 may be in contact with each other. In this case, the inside conductive metal layers 5 may function as spacers for setting the dimension g of the gap G.

Figure 5:
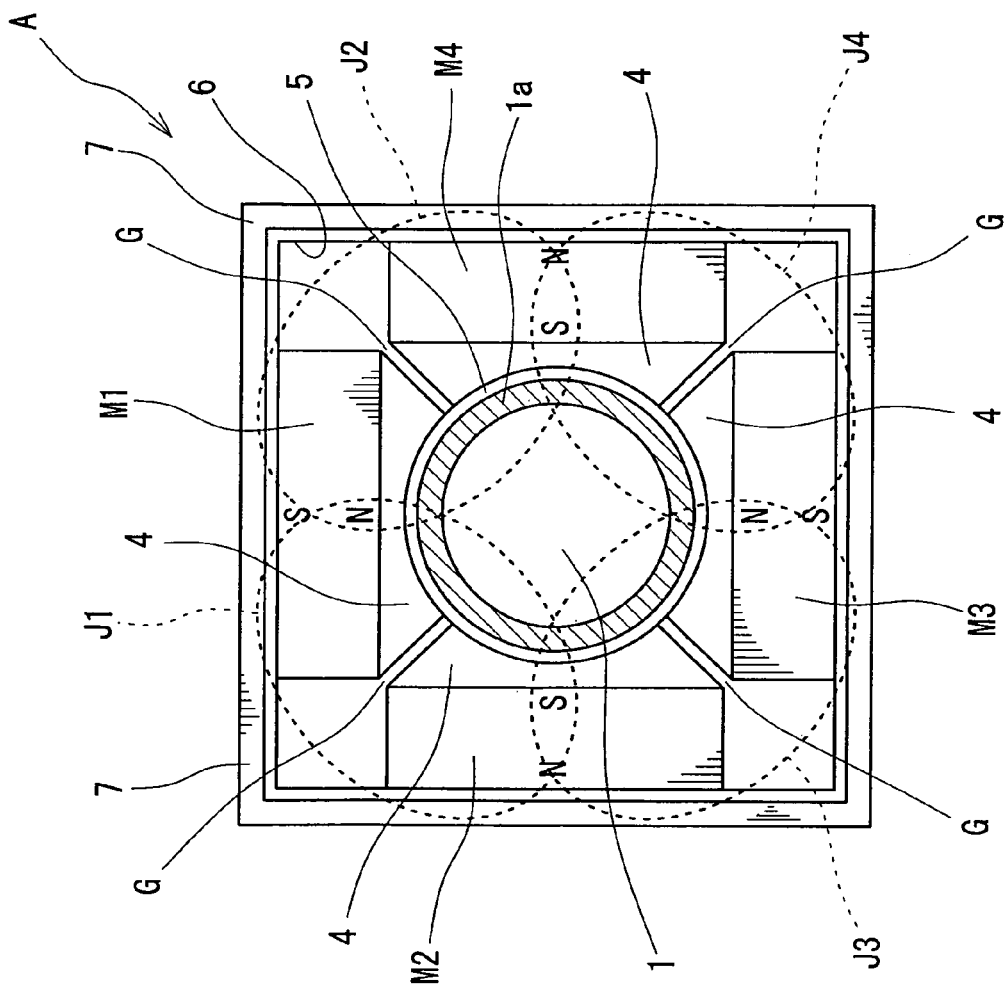
FIG. 5 is a sectional view showing an essential part of still another embodiment of the invention.

FIG. 5 is a sectional view showing an essential part of still another embodiment of the invention. This fluid treatment device A for fluid activation is basically constructed the same way as the device A shown in FIG. 1. The fluid treatment/activation device A shown in FIG. 5 differs from the device A shown in FIG. 1 in that the yokes 4 formed from a magnetic material are interposed between each of the permanent magnets M1 to M4 and the inside conductive metal layer 5, that the fluid passage 1 and the inside conductive metal layer 5 have circular cross sections, and that the first permanent magnet M1 and the third permanent magnet M3 as well as the second permanent magnet M2 and the fourth permanent magnet M4 present the same polarity at the mutually opposed surfaces thereof.

The yokes 4 are so disposed as to define gaps having the same dimension as the gaps G defined between respective pairs of permanent magnets M1 to M4. Each of the yokes 4 has an arcuate inside surface which is in contact with the inside conductive metal layer 5. Thus, the inside conductive metal layer 5 is substantially enclosed by the yokes 4. The individual yokes 4 are in contact with the respective permanent magnets M1 to M4 at the outside surfaces thereof. The yokes 4 are formed from a ferromagnetic material such as permalloy and soft iron.

The individual permanent magnets M1 to M4 mutually cooperate to constitute respective magnetic circuits J1 to J4 between the first permanent magnet M1 and the second permanent magnet M2, between the first permanent magnet M1 and the fourth permanent magnet M4, between the third permanent magnet M3 and the second permanent magnet M2 and between the third permanent magnet M3 and the fourth permanent magnet M4.

This fluid treatment device for fluid activation A is capable of even more effectively preventing the magnetic force from leaking out of the yokes 4 because the outside conductive metal layer 6 and the fluid passage 1 are enclosed by the yokes 4.

Figure 6:
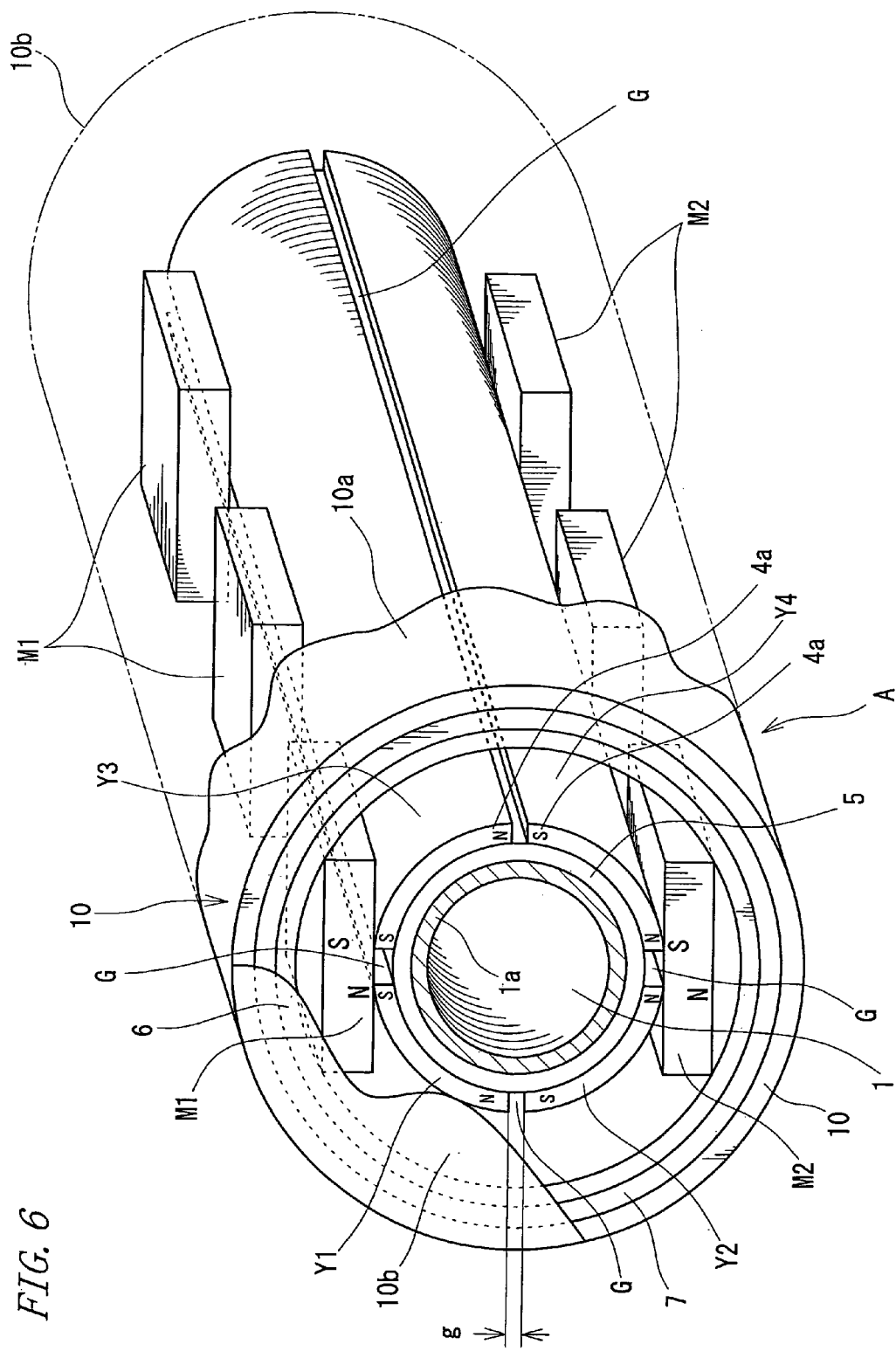
FIG. 6 is a partly cut-away perspective view showing still another embodiment of the invention.

FIG. 6 is a partly cut-away perspective view showing still another embodiment of the invention. In the figure, like reference characters are inserted as that of the corresponding components of the embodiment shown in FIG. 1. This fluid treatment/activation device A includes an axially elongated, cylindrical casing 10 which contains therein: a fluid passage 1 similarly elongated in the axial direction; an inside conductive metal layer 5 formed from a non-magnetic material; first yoke Y1, second yoke Y2, third yoke Y3 and fourth yoke Y4 which are formed from a magnetic body; The pairs of first permanent magnets M1 and second permanent magnets M2;

an outside conductive metal layer 6 formed from the nonmagnetic material; and a magnetic material layer 7.

The opposite ends of the casing 10 are hermetically closed with the end wall portions 10b shaped like a disc. The fluid passage 1 is constituted by the pipe member 1a having a circular cross section. The opposite ends of the pipe member project from the end wall portions 10b of the casing 10.

The inside conductive metal layer 5 is constituted by a pipe having a circular cross section. The layer 5 is in contact with the pipe member 1a constituting the fluid passage 1, thus solidly enclosing the overall periphery of the pipe member 1a. The inside conductive metal layer 5 extends along the overall length of the fluid passage 1 through the casing 10.

The paired first permanent magnet M1 and second permanent magnet M2 are opposed to each other as sandwiching the yokes Y1 to Y4 therebetween. The plural sets of first permanent magnets M1 and second permanent magnets M2 are respectively arranged in the axial direction of the casing 10 at predetermined space intervals. The first permanent magnet M1 and the second permanent magnet M2 are disposed in a manner to present the mutually opposite polarities at the mutually opposed surfaces thereof. In the figure, the north pole of the first permanent magnet M1 and the south pole of the second permanent magnet M2 face each other.

The yokes Y1 to Y4 have an arcuate cross section so as to be arranged along the overall outer periphery of the conductive metal layer 5. Of the yokes Y1 to Y4, the first yoke Y1 is paired with the second yoke Y2 and the third yoke Y3 is paired with the fourth yoke Y4. The yokes Y1 to Y4 define respective gaps G therebetween. The dimension of the gap G is designed to range from 0.2 to 2 mm.

The first yoke Y1 and the third yoke Y3 are in contact with the north pole of the first permanent magnet M1, while the second yoke Y2 and the fourth yoke Y4 are in contact with the south pole of the second permanent magnet M2. Therefore, the north pole of the first permanent magnet M1 is transferred to an end of the first yoke Y1 adjacent to the second yoke Y2 and to an end of the third yoke Y3 adjacent to the fourth yoke Y4. Further, the south pole of the second permanent magnet M2 is transferred to an end of the second yoke Y2 adjacent to the first yoke Y1 and to an end of the fourth yoke Y4 adjacent to the third yoke Y3.

The outside conductive metal layer 6 and the magnetic material layer 7 are individually constituted by cylindrical bodies, totally and solidly covering the first permanent magnets M1, the second permanent magnets M2 and the yokes Y1 to Y4.

The fluid treatment/activation device A of the above constitution is adapted to generate the magnetic flux lines between the first permanent magnets M1 and second permanent magnets M2 in paired relation and to apply the magnetic force to the fluid flowing through the fluid passage 1. The device is capable of generating extremely dense magnetic flux lines particularly in the vicinity of the gaps G where the south poles and the north poles are closest to each other. Therefore, the device can apply the intensive magnetic force to the fluid flowing near the gaps G, effectively activating the fluid flowing through the fluid passage 1. According to the embodiment, even the fluid flowing through the fluid passage 1 at a high flow rate, in particular, can be subjected to the intensive magnetic force because the plural pairs of first permanent magnets M1 and second permanent magnets M2 are arranged in the axial direction of the casing 10.

It is noted that the individual yokes Y1 to Y4 may be spaced away from the corresponding permanent magnets M1, M2. What is required is that the yokes are magnetically in contact with the permanent magnets so as to present the south pole opposite to the north pole or vice versa at the gap G.

<Verification Test 1>

The following test was conducted on the fluid treatment/activation device of the invention for verifying the effectiveness of fluid activation.

A device having the same construction as that of the fluid treatment/activation device A shown in FIG. 3 was prepared as an example hereof. The device employed two sets or eight neodymium magnets in total as the permanent magnets which had dimensions of 25 mm×25 mm×10 mm and a remanent magnetic flux density of 12300 Gs. The two sets of permanent magnets were arranged in the axial direction.

Figure 9:
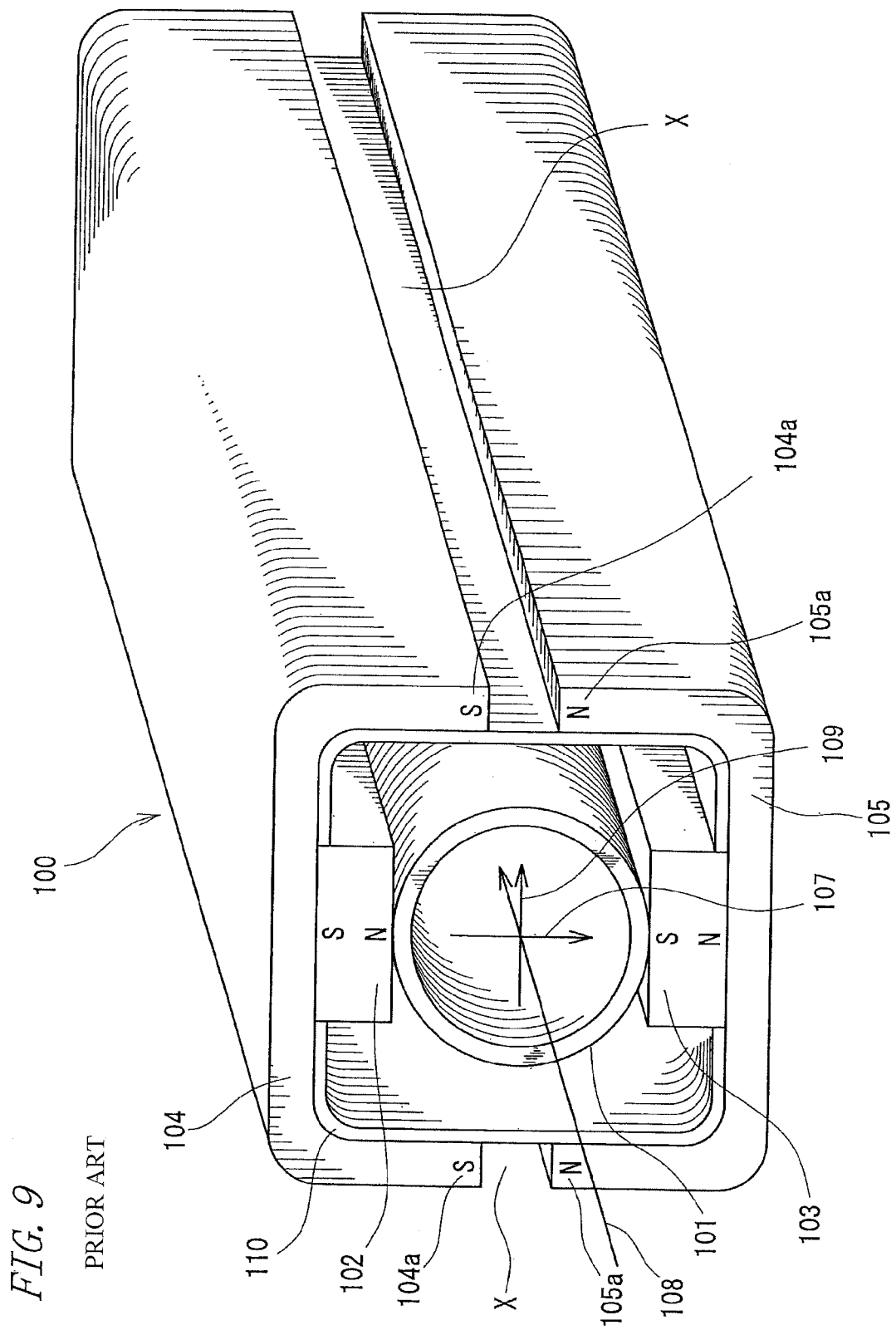
FIG. 9 is a perspective view showing an exemplary conventional fluid treatment device for fluid activation.

A device having the same basic construction as that of the fluid treatment/activation device 100 shown in FIG. 9 was prepared as a comparative example hereof. The device employed, as the conductive metal layer 110, plate-like copper sheets facing each other across the water conduit 101. The device also used two sets or eight magnets in total as the permanent magnets which were the same as those of the above example. The two sets of permanent magnets were arranged in the axial direction.

(Test Conditions)
(1) Temperature: room temperature substantially maintained constant
(2) Humidity: substantially maintained constant
(3) Measuring instrument: air-ionometer (American product IC-1000), Spray pump (No. 4130 commercially available from FURUPLA Co. Ltd)
(4) Measuring method: The respective devices were operated under the same conditions of the above-described temperature and humidity for taking measurements in 10 cycles. In each measurement cycle, water passed each of the fluid treatment/activation devices was sprayed from the above-described spray pump for 60 seconds. An average of the maximum value and a numerical value determined at the end of the spraying process was used as a measured value.

The example and the comparative example were each determined for the negative ion production under the above-described test conditions. The results are listed in the following table 1. A measured value of raw water not subjected to the fluid treatment/activation device is shown as a reference value.

TABLE 1

|  | Example | Comparative example | Reference |
| --- | --- | --- | --- |
| Negative ion measurement (particles/cc) | 13878 | 9375 | 5553 |

As apparent from Table 1, the fluid subjected to the fluid treatment/activation device of the example can produce negative ions about 1.5 times as much as the fluid subjected to the device of the comparative example.

<Verification Test 2>

The following test was conducted on the fluid treatment/activation device of the invention for further verifying its effectiveness of fluid activation.

The same fluid treatment/activation device as that used in the above verification test 1 was prepared as an example hereof.

The same fluid treatment/activation device as that used in the above verification test 1 was prepared as a comparative example hereof.

(Test Conditions)
Measuring method: Measurement was taken on the redox potential of water passed the fluid treatment/activation devices. The results are listed in the following table 2. It is noted that each water samples were at the same temperature.

TABLE 2

|  | Example | Comparative example |
|---|---|---|
| Redox potential (mV) | 450 | 490 |

As apparent from Table 2, the fluid subjected to the fluid treatment/activation device of the example exhibits the lower redox potential than that of the fluid subjected to the device of the comparative example. This suggests that the fluid subjected to the fluid treatment/activation device of the invention absorbs more electrons so as to be increased in the reducing power and dipolarity.

Figure 7:
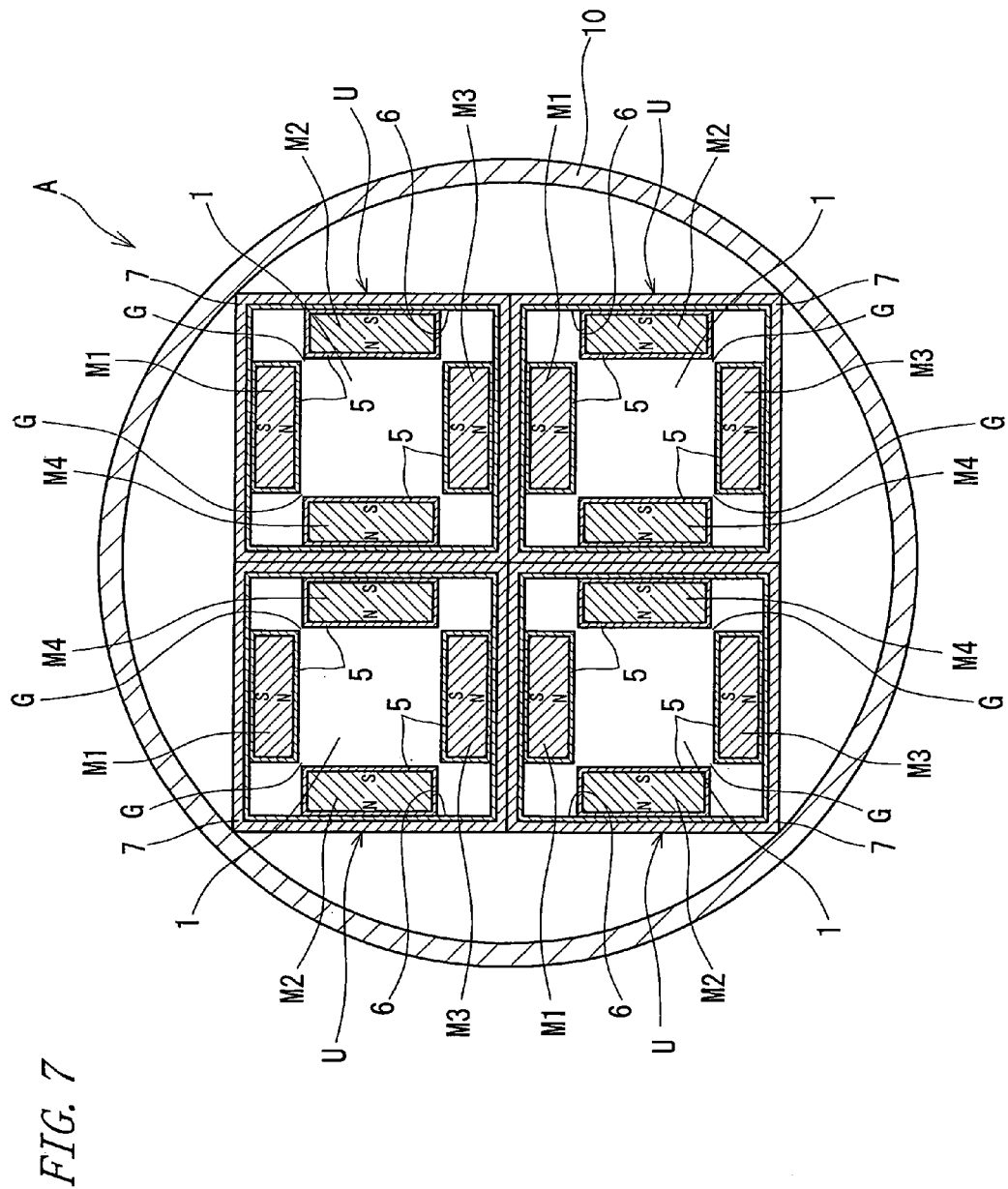
FIG. 7 is a sectional view showing still another embodiment of the invention.

Each of the above fluid treatment/activation devices A may include a plurality of fluid passages 1 in the casing 10 according to the fluid throughput. In this case, the following modification may be made as shown in FIG. 7 for example. In the Figure, the individual components including the inside conductive metal layer 5, the permanent magnets M1 to M4, the magnetic material layer 7 and the like but excluding the casing 10 are assembled into one unit U using a bond or by resin molding process. Further, the plural units U are combined in parallel relation such that the axes of the fluid passages 1 thereof extend in parallel. These units U are totally accommodated in the casing 10. In this case, the fluid treatment/activation device A may be applied to a large diameter pipe for supplying a large volume of fluid such as industrial water because the device is capable of effectively activating a large volume of fluid. The unitized design also provides for easy fabrication of a fluid treatment/activation device capable of producing a required magnetic force according to a fluid throughput.

Figure 8:
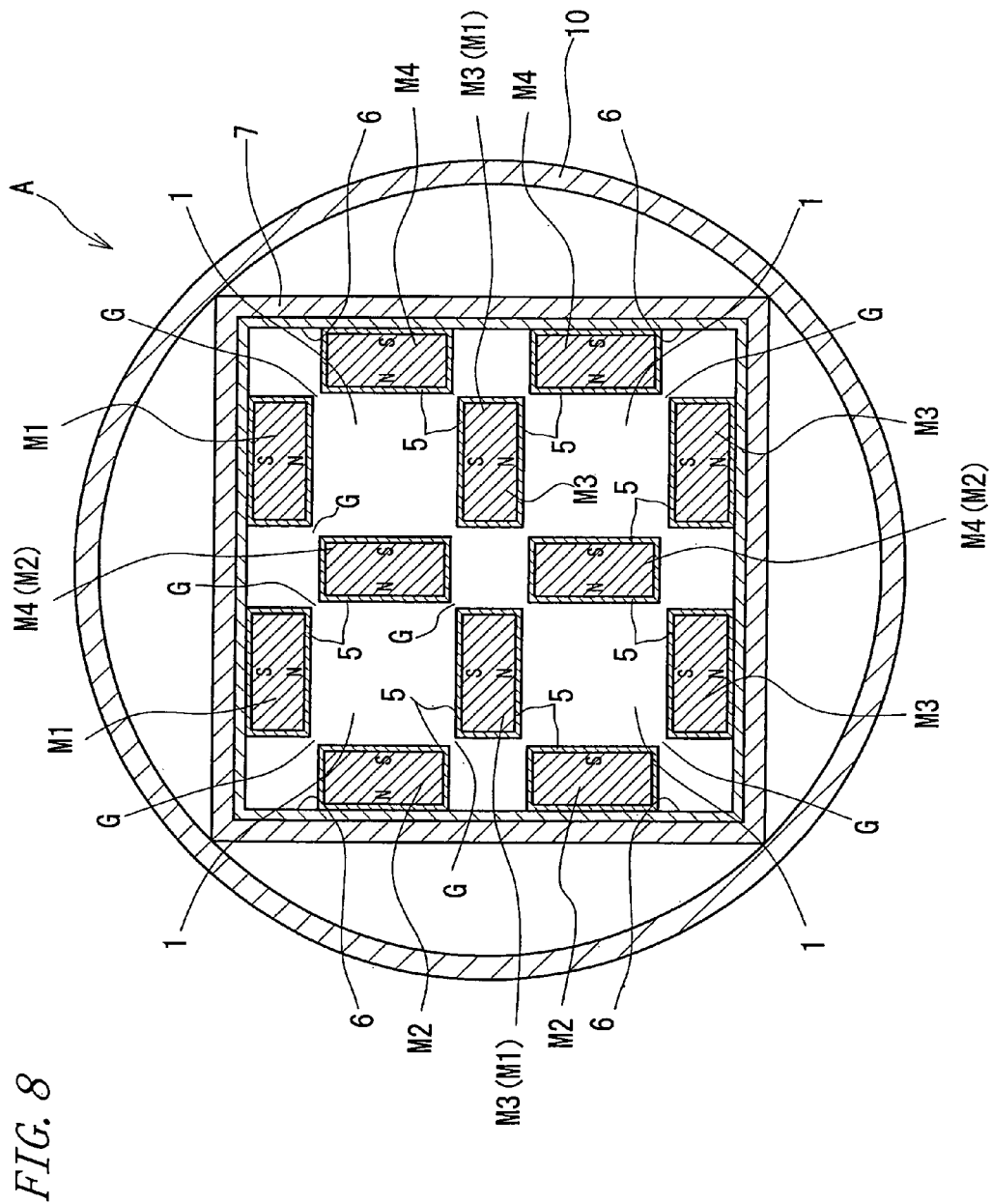
FIG. 8 is a sectional view showing still another embodiment of the invention.

Another embodiment including the plural fluid passages 1 may be made as shown in FIG. 8. The permanent magnets M1 to M4 individually covered with the inside conductive metal layers 5 are arranged in a frame pattern to define square spaces provided with the gaps G thereby to form the plural fluid passages 1. The permanent magnets M1 to M4 are totally and solidly enclosed by the outside conductive metal layer 6 and the magnetic material layer 7. In this case, the fluid passages 1 in adjacent relation can share the permanent magnet disposed therebetween.

The fluid treatment device for fluid activation according to the invention is not limited to the forgoing embodiments but various changes and modifications may be made thereto without departing from the scope of the invention. In the above embodiments, the magnetic material layer 7 is composed of a single tubular body. However, an alternative constitution may be made, for example, wherein at least the peripheral wall portion 10a of the casing 10 is formed from the magnetic material such as iron or permalloy so that the peripheral wall portion 10a per se constitutes the magnetic material layer 7. In this case, the casing 10 can also serve as the magnetic material layer 7 and hence, the device has a more simplified construction as compared with the case where the magnetic material layer 7 is formed independently. It is preferred in this case that at least an outside surface of the peripheral wall portion 10a is coated with a rust preventive layer of stainless steel, silicone resin or the like.

The inside conductive metal layer 5 and the outside conductive metal layer 6 may be formed from a metal sheet of copper, silver or the like. Further, these metal layers may also be formed from a composite laminate of a metal such as copper or silver and another metal having a different potential from the above metal, or formed from an alloy sheet containing a metal such as copper or silver. In a case where the inside conductive metal layer 5 is overlaid on the permanent magnet, the layer may be formed by plating the permanent magnet with a metal such as copper, silver or gold or by applying powder of any of the above metals. Further, the outside conductive metal layer 6 may also be formed by plating the inside surface of the magnetic material layer 7 with any of the above metals or by applying thereto any of the above metals. The inside conductive metal layer 5 may also be formed by tightly winding a wire of the above metal around the pipe member 1a, tightly winding a tape of the above metal around the pipe member 1a or spirally winding the tape around the pipe member 1a.

According to the invention, what is required is to provide at least a pair of permanent magnets. However, another permanent magnet may be added to the paired permanent magnets such that these permanent magnets are arranged to define a triangular space. The quadrangular space defined by the permanent magnets is not limited to the aforementioned square shape but may also be a rectangular shape, a rhombic shape or the like. The outside conductive metal layer 6 is provided as required.

The invention claimed is:

1. A fluid treatment device for fluid activation including at least a pair of permanent magnets arranged around a fluid passage extended through a casing and using a magnetic force of the permanent magnets for activating fluid flowing through the fluid passage, the treatment device comprising:
    a conductive metal layer interposed between the fluid passage and the permanent magnets and formed from a non-magnetic material enclosing the fluid passage; and
    a tubular magnetic material layer totally and solidly enclosing the permanent magnets thereby preventing the magnetic force of the permanent magnets from leaking out of the casing,
    wherein the paired permanent magnets are closely spaced from each other in a predetermined angular relation and define a gap therebetween and wherein one of the permanent magnets presents its north pole to the fluid passage and the other permanent magnet presents its south pole to the fluid passage.

2. A fluid treatment device for fluid activation according to claim 1, wherein the permanent magnets are provided in two pairs and are arranged in closely spaced relation to define a quadrangular space as defining gaps therebetween.

3. A fluid treatment device for fluid activation according to claim 2, wherein the fluid passage has a quadrangular cross section conforming to the quadrangular space.

4. A fluid treatment device for fluid activation according to claim 1, wherein the magnetic material layer comprises a part of the casing.

5. A fluid treatment device for fluid activation according to claim 1, wherein the conductive metal layer, the permanent magnets and the magnetic material layer are integrated into a single unit.

6. A fluid treatment device for fluid activation according to claim 1, wherein the conductive metal layer is formed on a surface of the permanent magnet.

7. A fluid treatment device for fluid activation according to claim 1, further comprising a conductive metal layer formed from a tubular non-magnetic material and extending along an inside surface of the magnetic material layer as totally and solidly enclosing the permanent magnets.

8. A fluid treatment device for fluid activation which includes at least a pair of permanent magnets having the north pole and the south pole thereof opposed to each other across a fluid passage extended through a casing and which uses a magnetic force of the permanent magnets for activating fluid flowing through the fluid passage, the treatment device comprising:
- a conductive metal layer interposed between the fluid passage and the permanent magnets and formed from a non-magnetic material enclosing the fluid passage;
- a tubular magnetic material layer totally and solidly enclosing the permanent magnets thereby preventing the magnetic force of the permanent magnets from leaking out of the casing; and
- at least a pair of yokes comprising magnetic bodies which discretely and magnetically make contact with one of the paired permanent magnets, which are arranged along an outside surface of the conductive metal layer as defining gaps therebetween and one of which has the north pole closely spaced from the south pole of the other magnetic body via the gap.

9. A fluid treatment device for fluid activation according to claim 8, further comprising a conductive metal layer formed from a tubular non-magnetic material and extending along an inside surface of the magnetic material layer as totally and solidly enclosing the permanent magnets.

* * * * *